(12) United States Patent
Jöngren

(10) Patent No.: US 10,051,492 B2
(45) Date of Patent: *Aug. 14, 2018

(54) METHOD AND ARRANGEMENT FOR ADAPTING A MULTI-ANTENNA TRANSMISSION

(71) Applicant: Telefonaktiebolaget LM Ericsson (publ), Stockholm (SE)

(72) Inventor: George Jöngren, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 7 days.

This patent is subject to a terminal disclaimer.

(21) Appl. No.: 15/198,418

(22) Filed: Jun. 30, 2016

(65) Prior Publication Data
US 2016/0316381 A1 Oct. 27, 2016

Related U.S. Application Data

(60) Continuation of application No. 14/791,568, filed on Jul. 6, 2015, now Pat. No. 9,419,695, which is a
(Continued)

(30) Foreign Application Priority Data

Apr. 30, 2007 (SE) ........................................ 070154

(51) Int. Cl.
*H04B 7/0456* (2017.01)
*H04W 24/02* (2009.01)
(Continued)

(52) U.S. Cl.
CPC ............ *H04W 24/02* (2013.01); *H04B 1/707* (2013.01); *H04B 7/04* (2013.01); *H04B 7/0413* (2013.01);
(Continued)

(58) Field of Classification Search
CPC .. H04B 7/0417; H04B 7/0413; H04B 7/0452; H04L 2025/03426; H04L 1/06
(Continued)

(56) References Cited

U.S. PATENT DOCUMENTS 7,336,734 B2 2/2008 Ferreol et al.
7,711,066 B2 5/2010 Jiang et al.
(Continued)

FOREIGN PATENT DOCUMENTS

GB 2415863 A 1/2006
WO 2004038952 A2 5/2004
(Continued)

OTHER PUBLICATIONS

Ericsson, "Precoding Considerations in LTE MIMO Downlink", TSG-RAN WG1 #48, Feb. 12-16, 2007, pp. 1-11, St. Louis, US, R1-071044.
(Continued)

*Primary Examiner* — Emmanuel Bayard
(74) *Attorney, Agent, or Firm* — Coats & Bennett, PLLC

(57) ABSTRACT

A method in a first node for adapting a multi-antenna transmission to a second node over a wireless channel is provided. The wireless channel has at least three inputs and at least one output. The first node and the second node are comprised in a wireless communication system. The method includes obtaining at least one symbol stream, determining a precoding matrix having a product structure created by a block diagonal matrix being multiplied from the left with a block diagonalizing unitary matrix, precoding the at least one symbol stream with the determined precoding matrix, and transmitting the precoded at least one symbol stream over a wireless channel to the second node.

26 Claims, 3 Drawing Sheets

Related U.S. Application Data continuation of application No. 14/302,640, filed on Jun. 12, 2014, now Pat. No. 9,077,401, which is a continuation of application No. 13/632,904, filed on Oct. 1, 2012, now Pat. No. 8,787,481, which is a division of application No. 12/597,759, filed as application No. PCT/SE2008/050374 on Mar. 31, 2008, now Pat. No. 8,306,140.

(51) Int. Cl.

| | | |
|---|---|---|
| *H04B 7/0417* | (2017.01) | |
| *H04B 7/06* | (2006.01) | |
| *H04L 25/03* | (2006.01) | |
| *H04B 1/707* | (2011.01) | |
| *H04B 7/04* | (2017.01) | |
| *H04B 7/0413* | (2017.01) | |
| *H04J 11/00* | (2006.01) | |
| *H04W 72/04* | (2009.01) | |
| *H04B 7/10* | (2017.01) | |
| *H04W 88/02* | (2009.01) | |
| *H04W 88/08* | (2009.01) | |

(52) U.S. Cl.
CPC ......... *H04B 7/0417* (2013.01); *H04B 7/0456* (2013.01); *H04B 7/0465* (2013.01); *H04B 7/0469* (2013.01); *H04B 7/0639* (2013.01); *H04B 7/0697* (2013.01); *H04J 11/00* (2013.01); *H04L 25/03343* (2013.01); *H04W 72/0446* (2013.01); *H04B 7/10* (2013.01); *H04L 2025/03426* (2013.01); *H04W 88/02* (2013.01); *H04W 88/08* (2013.01)

(58) Field of Classification Search
USPC .................................. 375/267, 299, 347, 349
See application file for complete search history.

(56) References Cited

U.S. PATENT DOCUMENTS

| | | | |
|---|---|---|---|
| 7,773,030 B2 | 8/2010 | Xia et al. | |
| 8,090,049 B2 | 1/2012 | Kent et al. | |
| 8,306,140 B2* | 11/2012 | Jongren | H04B 7/0417 375/267 |
| 8,599,946 B2 | 12/2013 | Kim et al. | |
| 8,787,481 B2* | 7/2014 | Jongren | H04B 7/0417 375/267 |
| 9,077,401 B2* | 7/2015 | Jongren | H04B 7/0417 |
| 9,419,695 B2* | 8/2016 | Jongren | H04B 7/0417 |
| 2004/0042439 A1 | 3/2004 | Menon et al. | |
| 2005/0032521 A1 | 2/2005 | Lee et al. | |
| 2005/0041751 A1 | 2/2005 | Nir et al. | |
| 2006/0146692 A1 | 7/2006 | Gorokhov et al. | |
| 2008/0049709 A1 | 2/2008 | Pan et al. | |
| 2008/0186212 A1* | 8/2008 | Clerckx | H04B 7/0456 341/55 |
| 2009/0310656 A1 | 12/2009 | Maltsev et al. | |
| 2010/0119001 A1 | 5/2010 | Walton et al. | |
| 2010/0183057 A1 | 7/2010 | Lee et al. | |
| 2011/0058621 A1* | 3/2011 | Clerckx | H04B 7/0456 375/267 |
| 2011/0110405 A1 | 5/2011 | Lee et al. | |
| 2011/0194650 A1 | 8/2011 | Lee et al. | |
| 2013/0100996 A1 | 4/2013 | Clerckx et al. | |

FOREIGN PATENT DOCUMENTS

| | | |
|---|---|---|
| WO | 2004064311 A1 | 7/2004 |
| WO | 2006007148 A1 | 1/2006 |
| WO | 2006049417 A1 | 5/2006 |

OTHER PUBLICATIONS

Lee, W. et al., "Polarization Diversity System for Mobile Radio", IEEE Transactions on Communications, Oct. 1972, pp. 912-923, vol. Com-20, No. 5, IEEE, Piscataway, NJ.

Love, D. et al., "Limited Feedback Unitary Precoding for Spatial Multiplexing Systems", IEEE Transactions on Information Theory, Aug. 2005, pp. 2967-2976, vol. 51, No. 8, IEEE, Piscataway, NJ.

Ericsson, "On the use of pre-coding in E-UTRA", 3GPP TSG RAN WG1 #47, Nov. 6-10, 2006, Riga, Latvia, R1-063129.

Texas Instruments, "Codebook Design for E-UTRA MIMO Precoding", 3GPP TSG RAN WG1 46bis, Oct. 9-13, 2006, pp. 1-8, Seoul, Korea, R1-062650.

Samsung, "Precoding for polarized 4Tx configurations", 3GPP TSG RAN WG1 Meeting #48bis, Mar. 26-30, 2007, pp. 1-8, St. Julian's, Malta, R1-071622.

LG Electronics, "Codebook Design and Evaluation for E-UTRA MIMO Precoding—4Tx Rank Adaptation Scheme", 3GPP TSG RAN WG1 Meeting #48, Feb. 12-16, 2007, pp. 1-9, St. Louis, US, R1-070914.

* cited by examiner

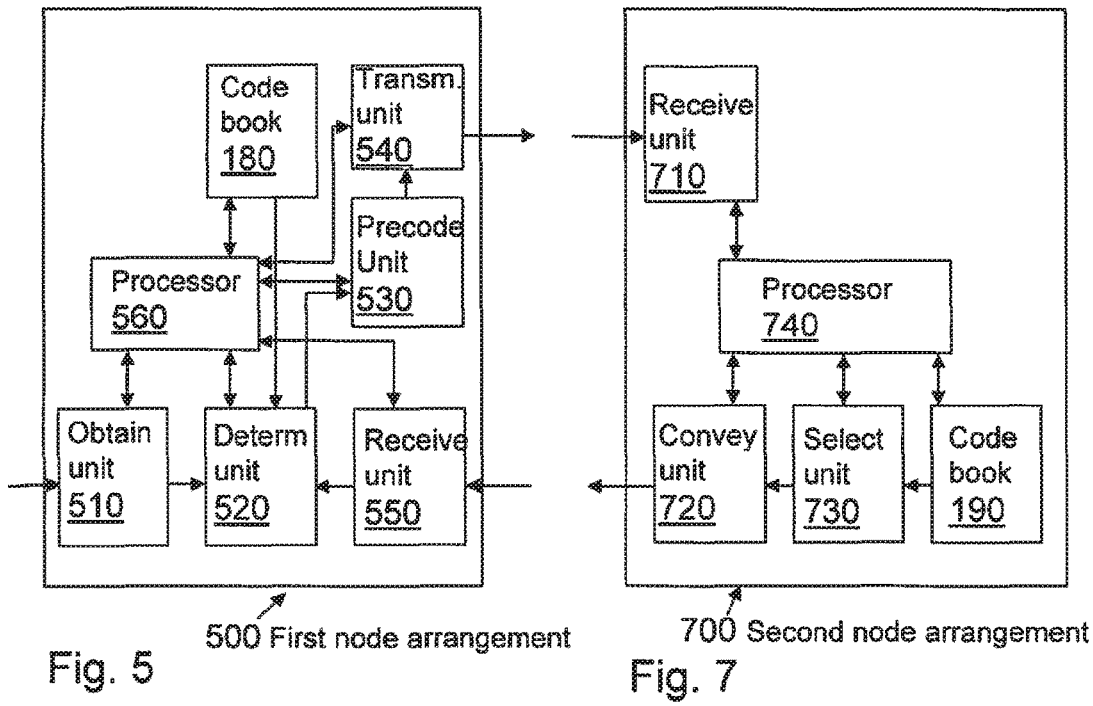
Fig. 5
Fig. 7
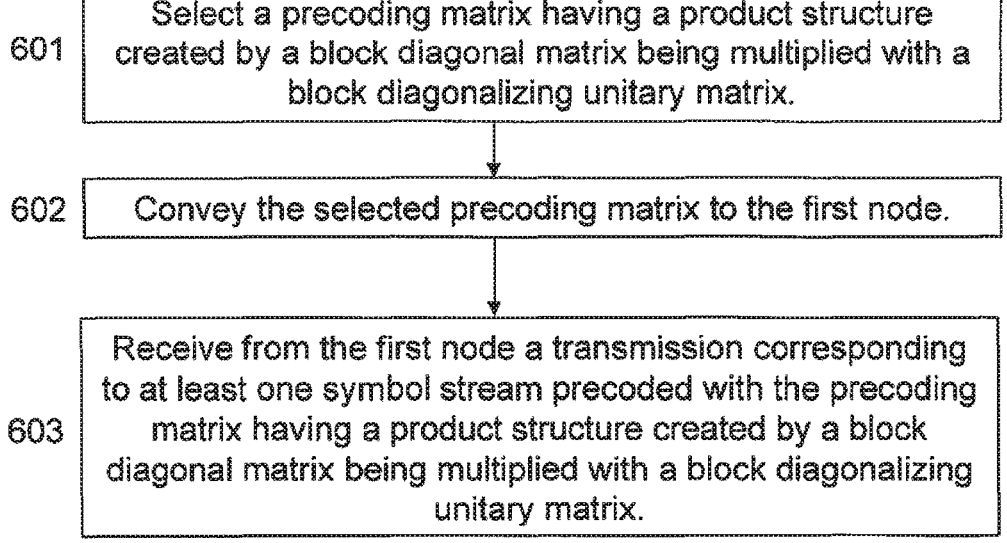
Fig. 6

METHOD AND ARRANGEMENT FOR ADAPTING A MULTI-ANTENNA TRANSMISSION

CROSS-REFERENCES TO RELATED APPLICATIONS

This application is a continuation application of co-pending U.S. application Ser. No. 14/791,568 entitled "Method and Arrangement for Adapting a Multi-Antenna Transmission" filed Jul. 6, 2015, which in turn is a continuation application of U.S. application Ser. No. 14/302,640 entitled "Method and Arrangement for Adapting a Multi-Antenna Transmission" filed Jun. 12, 2014, now U.S. Pat. No. 9,077,401, which in turn is a continuation application of U.S. application Ser. No. 13/632,904 entitled "Method and Arrangement for Adapting a Multi-Antenna Transmission" filed Oct. 1, 2012, now U.S. Pat. No. 8,787,481, which is turn is a divisional application of U.S. application Ser. No. 12/597,759 entitled "Method and Arrangement for Adapting a Multi-Antenna Transmission" filed Oct. 27, 2009, now U.S. Pat. No. 8,306,140, which is a National Stage application of PCT Application PCT/SE2008/050374 entitled "Method and Arrangement for Adapting a Multi-Antenna Transmission" filed Mar. 31, 2008, which in turn, claims priority from foreign application SE 0701054-9 filed Apr. 30, 2007. This application claims priority from each of the '568, '640, '904, '759, '374, and '054-9 applications, all of which are incorporated herein by reference in their entirety.

TECHNICAL FIELD

The present invention relates to a method and an arrangement in a first node and a method and an arrangement in a second node. In particular, it relates to adaptation of a multi-antenna transmission from the first node to the second node over a wireless channel.

BACKGROUND

The use of multiple antennas at a transmitter and/or a receiver of a node in a wireless communication system may significantly boost the capacity and coverage of the wireless communication system. Such Multiple Input Multiple Output (MIMO) systems exploit the spatial dimension of the communication channel to improve performance by for example transmitting several parallel information carrying signals, so-called spatial multiplexing. By adapting the transmission to the current channel conditions, significant additional gains may be achieved. One form of adaptation is to dynamically, from one Transmission Time Interval (TTI) to another, adjust the number of simultaneously transmitted information carrying signals to what the channel may support. This is commonly referred to as transmission rank adaptation. Precoding is another related form of adaptation where the phases and amplitudes of the aforementioned signals are adjusted to better fit the current channel properties. Classical beam-forming is a special case of precoding in which the phase of an information-carrying signal is adjusted on each transmit antenna so that all the transmitted signals add constructively at the receiver.

The signals form a vector-valued signal and the adjustment may be thought of as multiplication by a precoder matrix. The precoder matrix is chosen based on information about the channel properties. A common approach is to select the precoder matrix from a finite and countable set, a so-called codebook. Such codebook based precoding is an integral part of the Long Term Evolution (LTE) standard and will be supported in MIMO for High Speed Downlink Packet Access (HSDPA) in Wideband Code Division Multiple Access (WCDMA) as well. The receiver (e.g. User Equipment, UE) would then typically evaluate all the different precoder matrices in the codebook and signal to the transmitter (e.g. Node B) which element is preferred. The transmitter would then use the signalled information, when deciding which precoder matrix to apply. Since codebook indices need to be signalled and the receiver needs to select a suitable codebook element, it is important to keep the codebook size as small as possible. On the other hand, larger codebooks ensure that it is possible to find an entry that matches the current channel conditions more closely.

Codebook based precoding may be seen as a form of channel quantization. Alternatively, methods may be used that compute the precoder matrix without resorting to quantization.

The fundamental goal of precoder codebook design is to keep the codebook size small while still achieving as high performance as possible. Design of the elements in the codebook thus becomes crucial in order to achieve the intended performance.

Different antenna array configurations influence how the codebook elements should be designed. Many existing solutions are designed with spatially uncorrelated channel fading in mind and where each channel coefficient fades with the same average power. However, such a channel model is not sufficiently accurate when cross-polarized antenna arrays are used. Consequently, the existing designs are ill-suited for such a configuration—an antenna configuration which is deemed important in practice.

To understand why existing designs tailored for equal powered channel coefficients are not efficient for a cross-polarized antenna array setup, consider for simplicity a 2×2 MIMO system in which both the transmitter and the receiver use cross-polarized arrays and the two orthogonal polarizations are aligned on the transmit and receive side, e.g. a pair of vertically and horizontally polarized antennas on both sides of the link. The MIMO channel matrix will then be diagonally heavy, meaning that the on-diagonal elements on average have substantially more power than the off-diagonal ones, since the vertical and horizontal polarizations are on average fairly well-separated even after experiencing the radio channel and reaching the receiver. For such a channel, an appropriate codebook of minimal size contains the unit vectors and the identity matrix. This ensures that when one-stream transmission (rank-one transmission) is performed, all the transmit power may be allocated to the antenna with the strong channel and no power is wasted on the other antenna, which on average will not be able to convey significant power to the receiver. The reason for the latter is because of the cross-polarized setup in conjunction with the selection of rank-one transmission, which means the channel matrix will typically have only one element with a power substantially larger than zero and that element will lie on the diagonal.

All power should hence be allocated to the antenna which corresponds to the aforementioned non-zero diagonal element. For a precoder design which targets a scenario with equal powered channel coefficients, this is however typically not the case. This is ensured by a diagonal precoder structure or precoder codebook structure. For MIMO systems with more than two transmission (Tx) antennas, a block diagonal structure is suitable.

As already mentioned, cross-polarized arrays with vertical and horizontal polarization at transmitter tend to result in well-separated transmission pipes, which is attractive for multi-stream MIMO transmission. The common use of +−45 degree cross-polarized arrays are from this perspective not as attractive since the transmissions from the two different polarization mix on both the vertical as well as on the horizontal polarization. This potentially increases inter-stream interference and therefore hurts MIMO performance. A block diagonal precoder structure is thus not optimized for the +−45 cross-polarized case, which is a very common setup in existing deployments. Another problem with a block diagonal structure is that it leads to power imbalance problems among the Power Amplifiers (PA)s. All PAs are not running on full power unless pooling of PAs is used so that power among the PAs can be shared. Pooling PAs can however be complicated and expensive and is sometimes even not possible.

In practice the degree of separation between horizontal and vertical polarization may vary and thus increase inter-stream interference if the MIMO scheme solely relies on polarization to separate the streams. This also means that a purely block diagonal precoder may not be desirable. A mix of block diagonal elements and other elements may in fact be appropriate. This generally leads to a power imbalance problem on amplifiers, and because of the mix of block diagonal and non block diagonal elements, existing techniques for pooling PAs are no longer useful.

SUMMARY

The objective problem is to provide a mechanism for improving the performance of a wireless channel when using precoding.

According to a first aspect of the present invention, the object is achieved by a method in a first node for adapting a multi-antenna transmission to a second node over a wireless channel. The wireless channel has at least three inputs and at least one output. The first node and the second node are comprised in a wireless communication system. The method comprises the steps of obtaining at least one symbol stream, and determining a precoding matrix having a product structure created by a block diagonal matrix being multiplied from the left with a block diagonalizing unitary matrix. The method comprises the further steps of precoding the at least one symbol stream with the determined precoding matrix, and transmitting the precoded at least one symbol stream over a wireless channel to the second node.

According to a second aspect of the present invention, the object is achieved by a method in a second node for receiving a multi-antenna transmission from a first node over a wireless channel. The wireless channel has at least three inputs and at least one output. The first node and the second node are comprised in a wireless communication system. The method comprises the step of receiving a transmission corresponding to at least one symbol stream over a wireless channel conveyed from the first node. The at least one symbol stream is precoded with a precoding matrix having a product structure created by a block diagonal matrix being multiplied from the left with a block diagonalizing unitary matrix.

According to a third aspect of the present invention, the object is achieved by an arrangement in a first node for adapting a multi-antenna transmission to a second node over a wireless channel. The wireless channel has at least three inputs and at least one output. The first node and the second node are comprised in a wireless communication system. The first node arrangement comprises an obtaining unit configured to obtain at least one symbol stream, and a determining unit configured to determine a precoding matrix having a product structure created by a block diagonal matrix being multiplied from the left with a block diagonalizing unitary matrix. The first node arrangement further comprises precoding unit configured to precode the at least one symbol stream with the determined precoding matrix, and a transmitting unit configured to transmit the precoded at least one symbol stream over a wireless channel to the second node.

According to a fourth aspect of the present invention, the object is achieved by an arrangement in a second node for receiving a multi-antenna transmission from a first node over a wireless channel. The wireless channel having at least three inputs and at least one output. The first node and the second node are comprised in a wireless communication system. The second node arrangement comprises a receiving unit configured to receive a transmission corresponding to at least one symbol stream over a wireless channel conveyed from the first node. The at least one symbol stream is precoded with a precoding matrix having a product structure created by a block diagonal matrix being multiplied from the left with a block diagonalizing unitary matrix.

A precoding matrix having a product structure is used. The precoding matrix having a product structure is created by a block diagonal matrix being multiplied with a block diagonalizing unitary matrix. Using this matrix having a product structure for precoding a symbol stream when transmitting it over a wireless link, helps balancing the PAs. This implies that more power can be emitted into the propagation channel resulting in an improved performance of the wireless channel.

It is evidenced by the fact that a codebook multiplied by the mentioned unitary matrices produce a new codebook where each element in each matrix/vector has the same magnitude. Of particular interest is the use of a so-called block diagonalizing unitary matrix together with the commonly deployed +−45 polarized antennas, which simultaneously achieves power balancing and desirable rotation to polarized transmission in the horizontal and vertical direction even in the case of a mixture of block diagonal and some non-block diagonal precoder elements.

An advantage with the present solution is that using the matrix having a product structure, improves performance by e.g. allowing higher data rates or better reliability, particularly when the polarizations are not perfectly separated (e.g. moderate cross polar discrimination (XPD)) when used in conjunction with +−45 degree polarized arrays. The use of the PAs is also optimized thus reducing the power consumption as well as heat dissipation.

BRIEF DESCRIPTION OF THE DRAWINGS

The invention is described in more detail with reference to attached drawings illustrating exemplary embodiments of the invention and in which:

FIG. 5 is a schematic block diagram illustrating embodiments of a first node arrangement.

FIG. 6 is a flow chart illustrating embodiments of a method in a second node.

FIG. 7 is a schematic block diagram illustrating embodiments of a second node arrangement.

DETAILED DESCRIPTION

The invention is defined as a method and an arrangement in a respective first and second node, which may be put into practice in the embodiments described below.

Figure 1:
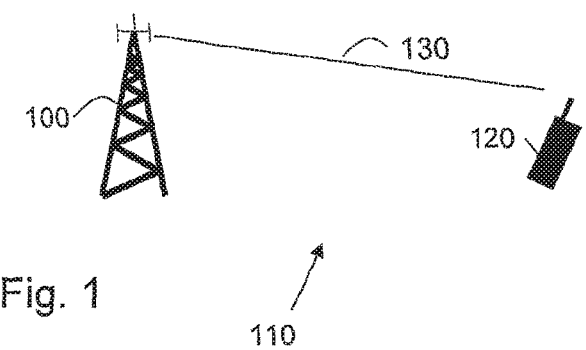
FIG. 1 is a schematic block diagram illustrating embodiments of a wireless communication system.

FIG. 1 depicts a first node 100 in a wireless communication system 110. The wireless communication system 110 may be a cellular system and/or a system such as e.g. Long Term Evolution (LTE), Evolved—Universal Terrestrial Radio Access (E-UTRA), Worldwide Interoperability for Microwave Access (WiMAX), Universal Terrestrial Radio Access (UTRA), Wideband Code Division Multiple Access (WCDMA), GSM, Ultra Mobile Wideband (UMB) or any other wireless communication system using technologies that perform adaptation between different forms of transmission and use multiple antennas. The first node 100 is arranged to communicate with a second node 120 in the wireless communication system 110 over a wireless channel 130. A linear and time-invariant MIMO filter may be used to model the input-output relation of the wireless channel during a sufficiently short transmission period. For sufficiently narrowband transmissions, a single matrix may be used for describing the filter. Such a channel matrix description also holds for modelling the channel over a subcarrier, (or several subcarriers as long they span a bandwidth which is small compared with the coherence bandwidth of the channel) in an Orthogonal Frequency Division Multiplexing (OFDM) system such as e.g. LTE. The first node 100 may be any type of a base station such as e.g. a NodeB as in LTE. The second node 120 may be a user equipment (UE) such as e.g. a mobile phone, a Personal Digital Assistant (PDA), a laptop. It may also be the other way around, that the first node 100 may be a UE such as e.g. a mobile phone, a Personal Digital Assistant (PDA) and the second node 120 may be any type of a base station such as e.g. a NodeB. In the example of FIG. 1, the first node 100 is a base station and the second node 120 is a user equipment. In addition, the first node 100 and the second node 120 may constitute arbitrary wireless devices in communication with each other and with no particular hierarchical ordering.

Figure 2:
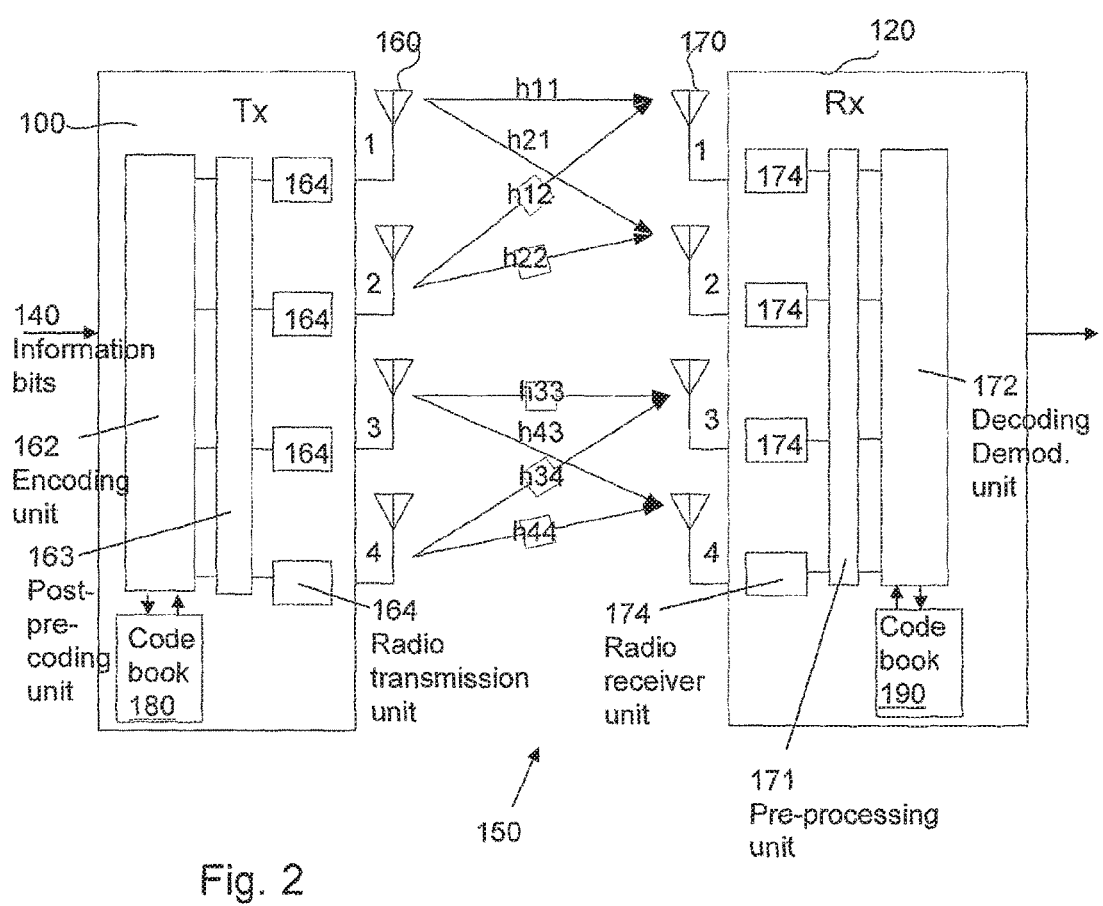
FIG. 2 is a schematic block diagram illustrating embodiments of a wireless communication system.

The first node 100 uses a multiple antenna system, i.e. uses multiple antennas for its transmission to the second node 120. The second node 120 may also use a multiple antenna system for reception of the first node's transmission. This is thus a MIMO system, where the inputs to the channel corresponds to the transmit antennas in the first node 100 and the outputs to the receive antennas in the second node 120. Transmitter and receiver filtering/processing may also be considered to be included into the channel. Note that such a MIMO setup may include the special case of only one receive antenna. FIG. 2 illustrates some embodiments wherein the first node 100 and a second node 120 are each using a multiple antenna system comprising four antennas. The first node 100 obtains an information carrying signal 140 being represented by a sequence of information bits, which information is to be conveyed to the second node 120 over the wireless channel 130. FIG. 2 schematically illustrates the first node 100 as being the transmitting node (Tx) and the second node 120 as being the receiving node (Rx), the first node 100 and the second node 120 may use a multiple-antenna system 150, resulting in a MIMO link. In this example the first node 100 comprises four transmit antennas 160 1, 2, 3 and 4, e.g. a base station with four transmit antennas, and the second node 120 comprises four receive antennas 170 1, 2, 3 and 4, e.g. a user equipment with four receive antennas.

In the example of FIG. 2, the first node 100 comprises an encoding unit 162, a post precoding unit 163 and four radio transmitter units 164. The encoding unit 162 is arranged to receive the information carrying signal 140 to be transmitted. The encoding unit 162 may further be arranged to possibly demultiplex the information bits into one or several information bit sequences, code these information bit sequences using some channel code (e.g. turbo code, low-density parity-check (LDPC) code, convolutional code), modulate the coded bits to produce symbols, map the symbols to a sequence of information carrying symbol vectors and precode the information carrying symbol vectors and finally forward the result to a possible post precoding unit 163. The post-precoding unit 163 may in the simplest of cases just forward the precoded signal (i.e., the post precoding unit 163 is transparent and would hence be viewed as not existing) or it might process it in some way, e.g. perform digital filtering in baseband, before outputting possibly processed signals for transmission utilizing the radio transmitter units 164, using the respective transmit antennas 160 1, 2, 3 and 4 for transmitting the precoded signal to the second node 120. It is appreciated that the basic functions of the transmitter are well known for a skilled person and not described in detail. The transmitter in this example may support techniques such as Spatial-Division Multiple Access (SDMA), SDMA precoding, MIMO, MIMO precoding, and/or MIMO-SDMA.

In the example of FIG. 2, the second node 120 comprises a pre-processing unit 171, a decoding demodulation unit 172 and four radio receiver units 174. The second node 120 is arranged to receive the precoded signal from the first node 100. The signal is received by means of the receive antennas 170 1, 2, 3 and 4, the pre-processing unit 171 and the radio receiver units 174. The pre-processing unit 171 may implement various processing steps, e.g. it may perform filtering in base band or simply forward the signals unaltered to the decoding demodulation unit 172. In the latter case, the pre-processing unit 171 may alternatively be considered not to be present (i.e., transparent corresponding to no pre-processing unit). The decoding demodulation unit 172 may be arranged to receive the coded signal from the pre-processing unit 171. The decoding demodulation unit 172 may further be arranged to demodulate the coded signal to data bits. It is appreciated that the basic functions of the receiver are well known for a skilled person and not described in detail herein.

It should also be noticed that both receiver in the second node 120 and transmitter in the first node 100 may alter operation mode functioning as transmitter and receiver, respectively.

Precoding

Figure 3:
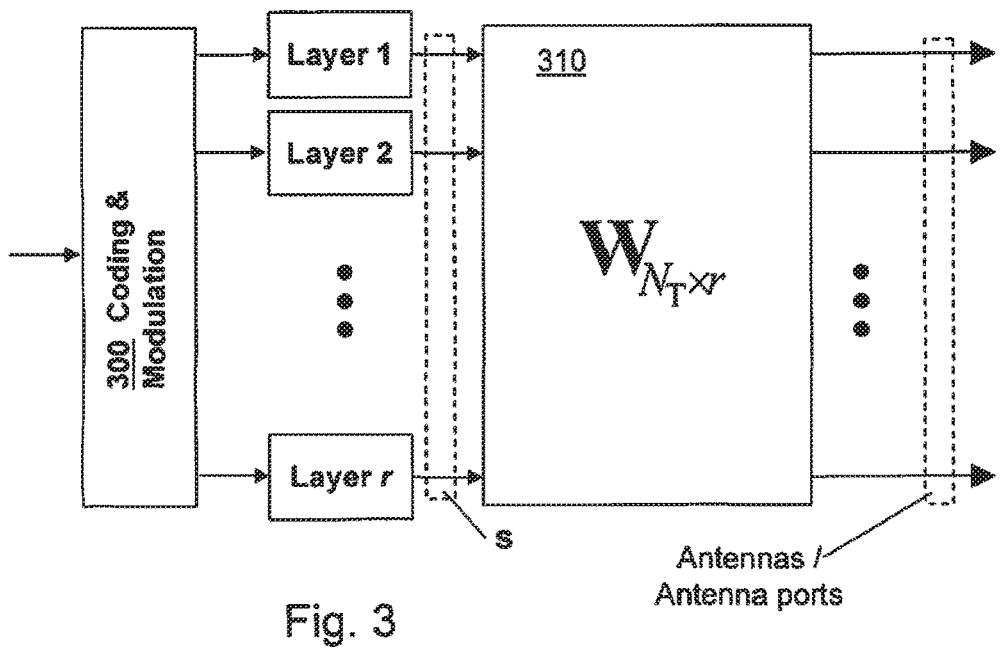
FIG. 3 is a schematic block diagram illustrating embodiments of a first node.

As already indicated, the encoding unit 162 in the first node 100 can be further subdivided into two parts, corresponding to a coding and modulation unit 300 and a precoding unit 310, such as e.g. a precoder. An example of a coding and modulation unit 300 and a precoding unit 310 is depicted in FIG. 3. The coding and modulation unit 300 takes information bits as input and produces a sequence of information carrying symbol vectors, i.e. a vector-valued information-carrying signal as output. The information carrying symbol vectors can be seen as one or several symbol streams in parallel where each element of each vector s thus belongs to a certain symbol stream. The different symbol streams are commonly referred to as layers and at any given moment there are different such layers corresponding to a transmission rank of r. Thus, the signal to be transmitted to the second node 120 over the wireless channel 130 comprises at least one symbol stream (or layer). The r symbols in a particular r×1 information carrying symbol vector s is subsequently multiplied by an NT×r precoder matrix $W_{N_T \times r}$, where NT denotes the number of inputs (e.g. number of transmit antennas, number of antenna ports etc) of the MIMO channel. The mentioned precoding operation forwards the resulting output to the post-precoding unit 163. The first node 100 determines a precoding matrix having a certain product structure, which will be further described in the sequel. This may be performed by choosing a precoding matrix to match the characteristics of the channel, i.e., to match an NR×NT MIMO channel matrix H. The precoder matrix $W_{N_T \times r}$ may thus depend on the value of the channel H. The r information carrying symbols in s are typically complex-valued. Support of rank adaptation allows the number of simultaneously transmitted symbol streams, r, to be set to suit the current channel characteristics. Subsequent to precoding, the signals are conveyed over the channel H and received by an antenna array with NR elements. The receiver possibly processes the signals by means of the pre-processing unit 171. Collecting the signals into an NR×1 vector y and considering the signals over a sufficiently narrow bandwidth, compared with the coherence bandwidth of the channel, gives the model $$y = HW_{N_T \times r} s + e$$

where e is usually modelled as a noise vector obtained as realizations of some random process and where the output of the channel thus corresponds to the output of pre-processing unit 171 (the latter which may be transparent). This model obviously also holds for OFDM systems (e.g. LTE, WiMaX etc) where it typically can be applied on a subcarrier basis.

Channel Matrix, H

Referring again to FIG. 2 the first node 100 comprises a multi-antenna system where in some embodiments at least one antenna emits radio waves in a horizontal polarization direction and at least one other antenna emits energy in the orthogonal (i.e., vertical) polarization direction. Such a dual-, or cross-, polarized antenna setup may thus contain a group of co-polarized antennas and another group of co-polarized antennas orthogonally polarized relative the former group. "Co-polarization" means the antennas are transmitting with the same polarization. Under ideal line-of-sight conditions, assuming ideal antenna responses and a similar dual-polarized antenna setup at the receive side, the cross-polarized antenna set-up results in a block diagonal channel matrix, which will be further explained below. In the example of FIG. 2, the first two transmit antennas 160, 1 and 2, are horizontally polarized and the remaining two, 3 and 4, are vertically polarized. The receive antennas in the second node 120 are similarly arranged. The co-polarized antennas in the transmit array may be spaced sufficiently far apart so that the fading is roughly uncorrelated among the channels associated with the co-polarized elements. As mentioned above, the channel may be modelled using a channel matrix. Without loss of generality, by appropriately reordering the transmit and receive antenna elements, the 4×4 resulting channel matrix H, then tends to have the block-diagonal structure according to:

$$H = \begin{bmatrix} h_{11} & h_{12} & 0 & 0 \\ h_{21} & h_{22} & 0 & 0 \\ 0 & 0 & h_{33} & h_{34} \\ 0 & 0 & h_{43} & h_{44} \end{bmatrix}$$

With such a block-diagonal effective channel matrix, signals transmitted on antennas 160 1 and 2 in the first node 100, do not reach receive antennas 170 3 and 4, and, correspondingly, signals from transmit antennas 160 3 and 4 do not reach receive antennas 170 1 and 2. As depicted in FIG. 2, for the first two transmit antennas 160, 1 and 2 being horizontally polarized, the complex-valued channel coefficient h11 represents the effective channel involving the physical channel between transmit antenna 160 1 and receive antenna 170 1, the complex-valued channel coefficient h12 represents the effective channel involving the physical channel between transmit antenna 160 2 and receive antenna 170 1, the complex-valued channel coefficient h21 represents the effective channel involving the physical channel between transmit antenna 160 1 and receive antenna 170 2, and the complex-valued channel coefficient h22 represents the effective channel involving the physical channel between transmit antenna 160 2 and receive antenna 170 2.

Furthermore, as depicted in FIG. 2, for the remaining two transmit antennas 160, 3 and 4 being vertically polarized, the complex-valued channel coefficient h33 represents the effective channel involving the physical channel between transmit antenna 160 3 and receive antenna 170 3, the complex-valued channel coefficient h34 represents the effective channel involving the physical channel between transmit antenna 160 4 and receive antenna 170 3, the complex-valued channel coefficient h43 represents the effective channel involving the physical channel between transmit antenna 160 3 and receive antenna 170 4, and the complex-valued channel coefficient h44 represents the effective channel involving the physical channel between transmit antenna 160 4 and receive antenna 170 4.

The general meaning of a block diagonal channel matrix is that it tends to have the structure $$H = \begin{bmatrix} H^{(1)}_{\tilde{M}_1 \times \tilde{L}_1} & Z_{\tilde{M}_1 \times \tilde{L}_2} & \cdots & Z_{\tilde{M}_1 \times \tilde{L}_K} \\ Z_{\tilde{M}_2 \times \tilde{L}_1} & H^{(2)}_{\tilde{M}_2 \times \tilde{L}_2} & & \vdots \\ \vdots & \cdots & \ddots & Z_{\tilde{M}_{K-1} \times \tilde{L}_K} \\ Z_{\tilde{M}_K \times \tilde{L}_1} & \cdots & Z_{\tilde{M}_K \times \tilde{L}_{K-1}} & H^{(K)}_{\tilde{M}_K \times \tilde{L}_K} \end{bmatrix}$$

where the matrix can be subdivided into off-diagonal $\tilde{M}_k \times \tilde{L}_l$ blocks $Z_{\tilde{M}_k \times \tilde{L}_l}$, k=1, 2, ..., K≠l=1, 2, ..., K and on-diagonal $\tilde{M}_k \times \tilde{L}_k$ blocks $H_{\tilde{M}_k \times \tilde{L}_k}^{(k)}$, k=1, 2, ..., K of possibly varying sizes. Note that the channel is defined to be block diagonal if it can be rearranged by means of appropriate row and column permutations to have a form as above such that the average powers (as averaged over sufficiently long time-period so that the fast fading is averaged out) of the channel coefficients in the off-diagonal blocks $Z_{\tilde{M}_k \times \tilde{L}_l}$, are significantly lower than the average powers of the channel coefficients in the on-diagonal blocks $H_{\tilde{M}_k \times \tilde{L}_k}^{(k)}$. Such significantly lower power would e.g occur if a cross-polarized antenna setup is used in the first node 100 and a similar cross-polarized antenna setup is used in the second node 120. The difference in average power between channel coefficients on the block diagonal and off the block diagonal is often, depending on the propagation scenario, around 6 dB or substantially higher. Even if the antenna setup used in the second node 120 is not exactly cross-polarized, the power differences may still be significant.

Precoding Matrix Having a Product Structure

In the present solution, the first node 100 determines a precoding matrix having a certain product structure. The notion of a product structure will be presented later and explicitly defined after the discussion on precoding and codebooks for precoding. The determined precoding matrix is to be used for precoding the at least one symbol stream (i.e., one or more layers) to be transmitted to the second node 120. The determination may be performed by choosing the precoding matrix to match the characteristics of the channel modelled using the channel matrix H. If the cross-polarized antenna setup at the first node 100 is using horizontal and vertically polarized antennas, a precoding with block diagonal structure is suitable since the use of a block diagonal structure precoder matches the block diagonal structure of the block diagonal channel matrix. However, if the mentioned antenna setup is instead using polarization oriented for example +−45 degrees, then the channel matrix is no longer likely to be as block diagonal as if horizontal and vertical polarizations would have been used. The precoder product structure is in this case beneficial since it involves decomposing the precoder into a product of two matrices, one unitary, so-called block diagonalizing unitary matrix, and one block diagonal matrix, where the latter matrix is multiplied from the left with the former. The block diagonalizing unitary matrix determined to be used, allows the +−45 degree cross-polarized antenna setup to be transformed into a virtual 0/90 degree cross-polarized antenna setup (i.e., horizontally and vertically polarized), which in turn sees a new resulting channel that has a tendency to be block diagonal. Since a block diagonal virtual channel is effectively obtained, the block diagonal precoder in the product structure can now be used to match its characteristics. Basically, the unitary matrix serves to rotate the polarizations so that the transmitted signals align with the vertical and horizontal directions. A benefit of such a product structure is that the precoders can be made to have constant modulus elements meaning that regardless of which exact product structure precoder is used, the same power is used on all the antenna ports. This thus solves the problem of having to deal with different transmit powers on the different power amplifiers (PAs). Thus, the product structure not only aligns the transmission in the beneficial horizontal and vertical polarizations but is also at the same time offering pooling of the PA powers between these two polarizations.

Codebook

Referring to FIG. 2, in some embodiments the first node 100 comprises a codebook 180. The first node 100 may perform the determination of the precoding matrix having a certain product structure by selecting the precoding matrix having a product structure from the codebook 180 comprised in the first node 100.

In some embodiments the second node 120 comprises a code book 190 as shown in FIG. 2. The second node 120 may select a precoding matrix from e.g. the codebook 190 and recommend the first node to use the selected precoding matrix. This may be performed by conveying the recommended precoding matrix to the first node 100. The first node 100 may then decide to use the recommended precoding matrix or exploit the provided channel information in some other way.

The codebook 180, 190 comprises precoding matrices where each precoding matrix may correspond to different multiple transmission modes or forms of spatial processing, e.g., channel dependent precoding, MIMO precoding, SDMA, SDMA with precoding, MIMO-SDMA, etc. Such information may be pre-defined. The codebook 180, 190 may further in addition to precoder matrices/vectors comprise many other parameters such as, transmission ranks, modulation choices, transport block sizes, powers and/or channelization codes etc. In some embodiments the codebook 180, 190 comprises a precoder where the transmission rank is implicitly given by the size of the precoder matrix. The codebook 180, 190 is suitable for an antenna setup at the first node with not necessarily 0/90 degree polarizations in that the codebook 180, 190 comprises one or more precoding matrices having said product structure. The codebook 180, 190 may further comprise precoding matrices having a non-product structure. However, according to the present method, the first node 100 or second node 120 is free to select a precoding matrix having said product structure from the codebook. The codebooks 180 and 190 may be known a priori by both the first node 100 and the second node 120. Also, the transmitter in the first node 100 may, for example, notify the receiver in the second node 120 of its codebook 180. A suitable codebook structure will also have a product structure in the meaning that a significant number of the precoder elements use the product structure. As previously indicated, precoder elements with a product structure may be written as $$W = V\tilde{W}$$

where V is an NT×NT block diagonalizing unitary matrix and $\tilde{W}$ is an NT×r block diagonal matrix.

The block diagonal characteristic of $\tilde{W}$ pertains to the placement of zeros in the precoder matrices. A block diagonal precoder matrix $\tilde{W} = \tilde{W}_{N_T \times r}$ may in general be written as $$\tilde{W} = \begin{bmatrix} \tilde{W}^{(1)}_{M_1 \times L_1} & 0_{M_1 \times L_2} & \cdots & 0_{M_1 \times L_K} \\ 0_{M_2 \times L_1} & \tilde{W}^{(2)}_{M_2 \times L_2} & \vdots & \vdots \\ \vdots & \cdots & \ddots & 0_{M_{K-1} \times L_K} \\ 0_{M_K \times L_1} & \cdots & 0_{M_K \times L_{K-1}} & \tilde{W}^{(K)}_{M_K \times L_K} \end{bmatrix}$$

where as seen only the $M_k \times L_k$ blocks $\tilde{W}^{(k)}_{M_k \times L_k}$, k=1, 2, . . . , K of possibly varying sizes on the diagonal (in the block domain) may contain non-zero elements. A precoder matrix is considered block diagonal if its columns and rows can be permuted so as to achieve the above form. The rank two case in Table 1 shows an example where the precoder matrices have the structure $$W = \begin{bmatrix} W^{(1)}_{2 \times 1} & 0_{2 \times 1} \\ 0_{2 \times 1} & W^{(2)}_{2 \times 1} \end{bmatrix}$$

Also note that a block may be of size 1×1. Thus, the identity matrix can also be considered to have a block diagonal structure.

One example of a block diagonalizing unitary matrix is given by $$\begin{bmatrix} 1 & 0 & 1 & 0 \\ 0 & 1 & 0 & 1 \\ 1 & 0 & -1 & 0 \\ 0 & 1 & 0 & -1 \end{bmatrix}$$

which, assuming a $N_T=4$ Tx antenna array where the first two antennas have a +45 polarization direction and the two last have a −45 degree polarization direction, will rotate the +−45 degree polarizations so as to align with the horizontal and vertical direction. Combined with the block diagonal elements $\tilde{W}$ in the set displayed in Table 1, the transmission can be viewed as coming from a block diagonal codebook applied to an antenna setup with vertically and horizontally polarized antennas. By multiplying the block diagonalizing unitary V with the $\tilde{W}$ matrices in Table1, the codebook of precoder elements in Table 2 is obtained. As seen, all the scalar elements in each precoder matrix have the same absolute value implying a balanced design in that regardless of which precoder element is chosen, the signals corresponding to the various antenna ports/transmit antennas all have the same power. Thus, the PAs can be fully utilized from the perspective of the precoding operation.

TABLE 1

Table 1: Example of a set of block diagonal $\tilde{W}$ matrices suitable especially well for two spatially separated (small distance) cross polarized antenna pairs in SU-MIMO mode.

| Tx Rank | Codebook per Rank |
|---|---|
| 1 | $\frac{1}{\sqrt{2}}\begin{bmatrix} 1 \\ \exp(j2\pi k/4) \\ 0 \\ 0 \end{bmatrix}, k = 0, \ldots 3$ |
|  | $\frac{1}{\sqrt{2}}\begin{bmatrix} 0 \\ 0 \\ 1 \\ \exp(j2\pi k/4) \end{bmatrix}, k = 0, \ldots 3$ |
| 2 | $\frac{1}{2}\begin{bmatrix} 1 & 0 \\ \exp(j2\pi k/4) & 0 \\ 0 & 1 \\ 0 & \exp(j2\pi k/4) \end{bmatrix}, k = 0, \ldots 3$ |

TABLE 2

Table 2: Example codebook of precoder matrices W having product structure.

| Tx Rank | Codebook per Rank |
|---|---|
| 1 | $\frac{1}{\sqrt{2}}\begin{bmatrix} 1 \\ \exp(j2\pi k/4) \\ 1 \\ \exp(j2\pi k/4) \end{bmatrix}, k = 0, \ldots 3$ |
|  | $\frac{1}{\sqrt{2}}\begin{bmatrix} 1 \\ \exp(j2\pi k/4) \\ -1 \\ -\exp(j2\pi k/4) \end{bmatrix}, k = 0, \ldots 3$ |

TABLE 2-continued

Table 2: Example codebook of precoder matrices W having product structure.

| Tx Rank | Codebook per Rank |
|---|---|
| 2 | $\frac{1}{2}\begin{bmatrix} 1 & 1 \\ \exp(j2\pi k/4) & \exp(j2\pi k/4) \\ 1 & -1 \\ \exp(j2\pi k/4) & -\exp(j2\pi k/4) \end{bmatrix}, k = 0, \ldots 3$ |

The codebook in Table 2, works fine as long as the two polarizations are well-separated, i.e., if the cross-polar discrimination (XPD) is sufficiently high. To improve the performance for scenarios with medium XPD, it is beneficial to allow the sign of the weights for the two polarizations to vary, as exemplified by the set of matrices for $\tilde{W}$ in Table 3, Table 4 and Table 5. This helps avoiding that the two polarizations cancel each other. The problem is then that even multiplying with the above V matrix leads to power imbalances among the PAs. In other words, not all elements in each precoder matrix/vector multiplication have the same magnitude. In this case, a better choice may be to multiply with $$V = \begin{bmatrix} \exp(j\pi/4) & 0 & \exp(-j\pi/4) & 0 \\ 0 & \exp(j\pi/4) & 0 & \exp(-j\pi/4) \\ \exp(j\pi/4) & 0 & -\exp(-j\pi/4) & 0 \\ 0 & \exp(j\pi/4) & 0 & -\exp(-j\pi/4) \end{bmatrix}.$$

This ensures that all elements have the same amplitude and thus enables full use of all PAs, yet it provides the advantage of transforming +−45 degree polarizations into vertical and horizontal polarizations, which provide better separation of the streams in multi-stream mode.

The codebooks and the above unitary matrices can easily be generalized to other transmit array sizes (i.e., other than four antennas) and it is also possible to multiply the precoder elements from the right with some possibly unitary matrix or matrices and additional matrix multiplications from the left as well. This includes permuting the rows and/or columns of the precoder elements. These codebooks can also be subsets of larger codebooks. In conjunction to this, it should be noted that there are many equivalent ways of expressing the above product structure, in particular for the block diagonalizing unitary matrix V. For example, other equivalent forms of expressing the first exemplified V would be $$\begin{bmatrix} 1 & 0 & -1 & 0 \\ 0 & 1 & 0 & -1 \\ 1 & 0 & 1 & 0 \\ 0 & 1 & 0 & 1 \end{bmatrix} \text{ or } \begin{bmatrix} -1 & 0 & 1 & 0 \\ 0 & -1 & 0 & 1 \\ 1 & 0 & 1 & 0 \\ 0 & 1 & 0 & 1 \end{bmatrix}$$

In general, the notion of a block diagonalizing unitary matrix is defined to mean a unitary (unitary up to a scaling factor) matrix such that for a particular cross-polarized antenna setup, it creates a virtual cross-polarized antenna setup which mimics the transmission from a cross-polarized antenna setup with vertically and horizontally polarized antennas, which at the same time ensures that together with the block diagonal matrices in the product structure, all scalar elements of the resulting product structure precoder matrices have the same absolute value. Thus, the block diagonalizing unitary matrix rotates the polarizations in said manner and ensures that the use of the PAs is balanced. Furthermore the notion of a 45 degree block diagonalizing unitary matrix is defined to mean a block diagonalizing unitary matrix that rotates the polarization directions 45 degrees.

TABLE 3

Table 3: Example structure of set of $\tilde{W}$ matrices suitable especially well for two spatially separated (small distance) cross polarized antenna pairs in SU-MIMO mode. Note that for notational simplicity, the scaling of the matrices so as to keep the total transmit power constant regardless of selected precoding matrix has intentionally been left out.

| Tx Rank | Codebook per Rank |
|---|---|
| 1 | $\begin{bmatrix} 1 \\ \exp(j2\pi k/4) \\ 0 \\ 0 \end{bmatrix}, k = 0, \ldots 3$ |
| | $\begin{bmatrix} 0 \\ 0 \\ 1 \\ \exp(j2\pi k/4) \end{bmatrix}, k = 0, \ldots 3$ |
| | $\begin{bmatrix} 1 \\ \exp(j2\pi k/4) \\ 1 \\ \exp(j2\pi k/4) \end{bmatrix}, k = 0, \ldots 3$ |
| | $\begin{bmatrix} 1 \\ \exp(j2\pi k/4) \\ -1 \\ -\exp(j2\pi k/4) \end{bmatrix}, k = 0, \ldots 3$ |
| 2 | $\begin{bmatrix} 1 & 0 \\ \exp(j2\pi k/4) & 0 \\ 0 & 1 \\ 0 & \exp(j2\pi k/4) \end{bmatrix}, k = 0, \ldots 3$ |
| | $\begin{bmatrix} 1 & 1 \\ \exp(j2\pi k/4) & \exp(j2\pi k/4) \\ 1 & -1 \\ \exp(j2\pi k/4) & -\exp(j2\pi k/4) \end{bmatrix}, k = 0, \ldots 3$ |

TABLE 4

Table 4: Example structure of set of $\tilde{W}$ matrices suitable especially well for two spatially separated (large distance) cross polarized antenna pairs in SU-MIMO mode. Note that for notational simplicity, the scaling of the matrices so as to keep the total transmit power constant regardless of selected precoding matrix has intentionally been left out.

| Tx Rank | Codebook per Rank |
|---|---|
| 1 | $\begin{bmatrix} 1 \\ \exp(j2\pi k/4) \\ 0 \\ 0 \end{bmatrix}, k = 0, \ldots 3$ |

TABLE 4-continued

Table 4: Example structure of set of $\tilde{W}$ matrices suitable especially well for two spatially separated (large distance) cross polarized antenna pairs in SU-MIMO mode. Note that for notational simplicity, the scaling of the matrices so as to keep the total transmit power constant regardless of selected precoding matrix has intentionally been left out.

| Tx Rank | Codebook per Rank |
|---|---|
| | $\begin{bmatrix} 0 \\ 0 \\ 1 \\ \exp(j2\pi k/4) \end{bmatrix}, k = 0, \ldots 3$ |
| | $\begin{bmatrix} 1 \\ \exp(j2\pi k/2) \\ 1 \\ \exp(j2\pi k'/2) \end{bmatrix}, k = 0, \ldots, 1 \; k' = 0, \ldots, 1$ |
| | $\begin{bmatrix} 1 \\ \exp(j2\pi k/2) \\ -1 \\ -\exp(j2\pi k'/2) \end{bmatrix}, k = 0, \ldots, 1 \; k' = 0, \ldots, 1$ |
| 2 | $\begin{bmatrix} 1 & 0 \\ \exp(j2\pi k/4) & 0 \\ 0 & 1 \\ 0 & \exp(j2\pi k'/4) \end{bmatrix}, k = 0, \ldots, 1 \; k' = 0, \ldots, 1$ |
| | $\begin{bmatrix} 1 & 1 \\ \exp(j2\pi k/2) & \exp(j2\pi k/2) \\ 1 & -1 \\ \exp(j2\pi k'/2) & \exp(j2\pi k'/2) \end{bmatrix}, k = 0, \ldots, 1 \; k' = 0, \ldots, 1$ |
| | $W_{2\times2} \in W = \left\{ \begin{bmatrix} 1 & 1 \\ 1 & -1 \end{bmatrix}, \begin{bmatrix} 1 & 1 \\ j & -j \end{bmatrix} \right\}$ |
| | $\begin{bmatrix} W_{2\times2} \\ 0 \\ 0 \end{bmatrix}, W_{2\times2} \in W$ |
| | $\begin{bmatrix} 0 \\ 0 \\ W_{2\times2} \end{bmatrix}, W_{2\times2} \in W$ |
| 3 | $W_{2\times2} \in W = \left\{ \begin{bmatrix} 1 & 1 \\ 1 & -1 \end{bmatrix}, \begin{bmatrix} 1 & 1 \\ j & -j \end{bmatrix} \right\}$ |
| | $\begin{bmatrix} W_{2\times2} & 0 \\ 0 & 1 \\ 0 & \exp(j2\pi k'/4) \end{bmatrix}, W_{2\times2} \in W, k' = 0, \ldots, 3$ |
| | $\begin{bmatrix} 1 & 0 \\ \exp(j2\pi k/4) & 0 \\ 0 & W_{2\times2} \end{bmatrix}, W_{2\times2} \in W, k = 0, \ldots, 3$ |
| 4 | $W_{2\times2} \in W = \left\{ \begin{bmatrix} 1 & 1 \\ 1 & -1 \end{bmatrix}, \begin{bmatrix} 1 & 1 \\ j & -j \end{bmatrix} \right\}$ |
| | $\begin{bmatrix} W_{2\times2} & 0 \\ 0 & V_{2\times2} \end{bmatrix}, W_{2\times2} \in W, V_{2\times2} \in W$ |

TABLE 5

Table 5: Example structure of set of $\tilde{W}$ matrices suitable especially well for two spatially separated (large distance) cross polarized antenna pairs in SU-MIMO mode. Note that for notational simplicity, the scaling of the matrices so as to keep the total transmit power constant regardless of selected precoding matrix has intentionally been left out.

| Tx Rank | Codebook per Rank |
| --- | --- |
| 1 | $\begin{bmatrix} 1 \\ \exp(j2\pi k/4) \\ 0 \\ 0 \end{bmatrix}, k = 0, \ldots 3$ |
|  | $\begin{bmatrix} 0 \\ 0 \\ 1 \\ \exp(j2\pi k/4) \end{bmatrix}, k = 0, \ldots 3$ |
|  | $\begin{bmatrix} 1 \\ \exp(j2\pi k/2) \\ 1 \\ \exp(j2\pi k'/2) \end{bmatrix}, k = 0, \ldots, 1 \; k' = 0, \ldots, 1$ |
|  | $\begin{bmatrix} 1 \\ \exp(j2\pi k/2) \\ -1 \\ -\exp(j2\pi k'/2) \end{bmatrix}, k = 0, \ldots, 1 \; k' = 0, \ldots, 1$ |
| 2 | $\begin{bmatrix} 1 & 0 \\ \exp(j2\pi k/4) & 0 \\ 0 & 1 \\ 0 & \exp(j2\pi k'/4) \end{bmatrix}, k = 0, \ldots, 3 \; k' = 0, \ldots, 3$ |
| 3 | $W_{2\times 2} \in W = \left\{ \begin{bmatrix} 1 & 1 \\ 1 & -1 \end{bmatrix}, \begin{bmatrix} 1 & 1 \\ j & -j \end{bmatrix} \right\}$ |
|  | $\begin{bmatrix} W_{2\times 2} & 0 \\ 0 & 1 \\ 0 & \exp(j2\pi k'/4) \end{bmatrix}, W_{2\times 2} \in W, \; k' = 0, \ldots, 3$ |
|  | $\begin{bmatrix} 1 & 0 \\ \exp(j2\pi k/4) & 0 \\ 0 & W_{2\times 2} \end{bmatrix}, W_{2\times 2} \in W, \; k = 0, \ldots, 3$ |
| 4 | $W_{2\times 2} \in W = \left\{ \begin{bmatrix} 1 & 1 \\ 1 & -1 \end{bmatrix}, \begin{bmatrix} 1 & 1 \\ j & -j \end{bmatrix} \right\}$ |
|  | $\begin{bmatrix} W_{2\times 2} & 0 \\ 0 & V_{2\times 2} \end{bmatrix}, W_{2\times 2} \in W, V_{2\times 2} \in W$ |

Figure 4:
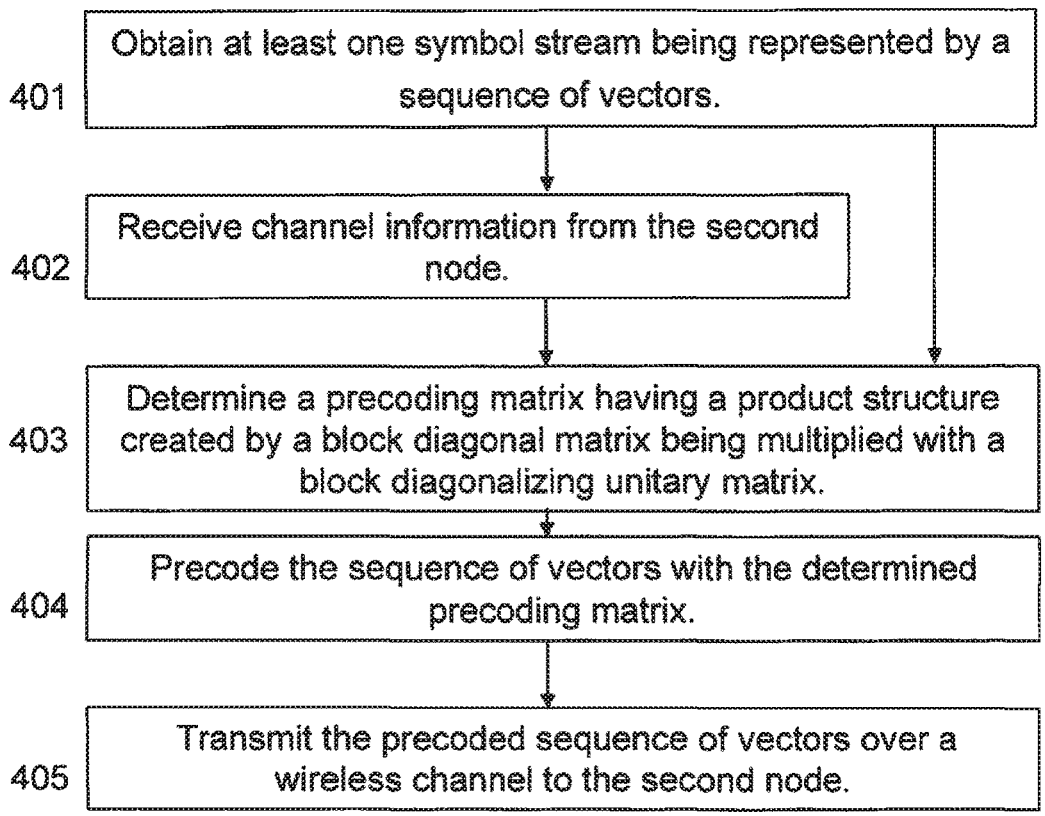
FIG. 4 is a flow chart illustrating embodiments of a method in a first node.

Method steps in the first node 100 for adapting a multi-antenna transmission to the second node 120 over a wireless channel 130 according to some embodiments will now be described with reference to a flowchart depicted in FIG. 4. The wireless channel 130 has at least three inputs and at least one output. The first node 100 and the second node 120 are comprised in the wireless communication system 110. The method comprising the steps of:

401. The first node obtains at least one symbol stream. The symbol stream is intended to be transmitted to the second node 120 over the wireless channel.

402. This step is optional. In some embodiments the first node 100 receives channel information from the second node 120. Channel information is in general a quantity which is statistically related to the wireless channel. Examples of channel information includes channel estimates, quantized channel estimates, precoder recommendations etc. In particular, the received channel information may comprise a precoding matrix that the second node 120 recommends the first node 100 to use for the step of precoding. In some embodiments wherein said channel information comprises a channel estimate this channel estimate may be used by the first node 100 for determining a suitable precoder matrix for the transmission.

403. In this step the first node 100 determines a precoding matrix having a product structure created by a block diagonal matrix being multiplied from the left with a block diagonalizing unitary matrix.

In some embodiments the block diagonalizing unitary matrix is a 45 degree block diagonalizing unitary matrix.

In some embodiments the first node 100 has received channel information from the second node 120 in the optional step 402. In these embodiments this step of determining the precoding matrix is performed based on the channel information received from the second node 120.

This step of determining the precoding matrix may also be performed by basing the determination on measurements carried out in a reverse link, i.e. measurements in the first node 100 of received signals originating from transmissions from the second node 120, and/or exploiting channel reciprocity properties. Channel reciprocity means that the channel, or certain properties of the channel, is similar in the forward (from first node 100 to second node 120) and reverse (from second node 120 to first node 100) links. The measurements on a reverse link may comprise a channel estimate.

In some embodiments the first node 100 comprises a precoding codebook 180 comprising precoding elements, wherein at least half of the precoding elements in the precoding codebook 180 have said product structure. In this case this step may be performed by selecting the precoding matrix having a product structure from the code book 180.

The block diagonalizing unitary matrix may e.g. be equivalent to $$\begin{bmatrix} 1 & 0 & 1 & 0 \\ 0 & 1 & 0 & 1 \\ 1 & 0 & -1 & 0 \\ 0 & 1 & 0 & -1 \end{bmatrix} \text{ or } \begin{bmatrix} \exp(j\pi/4) & 0 & \exp(-j\pi/4) & 0 \\ 0 & \exp(j\pi/4) & 0 & \exp(-j\pi/4) \\ \exp(j\pi/4) & 0 & -\exp(-j\pi/4) & 0 \\ 0 & \exp(j\pi/4) & 0 & -\exp(-j\pi/4) \end{bmatrix}$$

404. The first node 100 precodes the at least one symbol stream with the determined precoding matrix.

405. The first node 100 then transmits the precoded at least one symbol stream over a wireless channel 130 to the second node 120. In some embodiments the transmission of the precoded at least one symbol stream in the first node 100 is conducted using a multi-antenna system with a cross-polarized antenna set-up.

To perform the method steps above, the first node 100 comprises an arrangement 500 depicted in FIG. 5. As mentioned above, the first node 100 and the second node 120 are comprised in the wireless communication system 110. The first node arrangement is arranged to adapt a multi-antenna transmission to a second node 120 over a wireless channel. The wireless channel 130 has at least three inputs and at least one output. As mentioned above, the first node 100 and the second node 120 are comprised in the wireless communication system 110.

The first node arrangement 500 comprises an obtaining unit 510 configured to obtain at least one symbol stream.

The first node arrangement 500 further comprises a determining unit 520 configured to determine a precoding matrix having a product structure created by a block diagonal matrix being multiplied from the left, with a block diagonalizing unitary matrix. In some embodiments the block diagonalizing unitary matrix is a 45 degree block diagonalizing unitary matrix.

The determining unit 520 may further be configured to determine the precoding matrix by basing the determination on measurements on a reverse link and/or exploiting channel reciprocity properties.

The block diagonalizing unitary matrix may be equivalent to $$\begin{bmatrix} 1 & 0 & 1 & 0 \\ 0 & 1 & 0 & 1 \\ 1 & 0 & -1 & 0 \\ 0 & 1 & 0 & -1 \end{bmatrix} \text{ or } \begin{bmatrix} \exp(j\pi/4) & 0 & \exp(-j\pi/4) & 0 \\ 0 & \exp(j\pi/4) & 0 & \exp(-j\pi/4) \\ \exp(j\pi/4) & 0 & -\exp(-j\pi/4) & 0 \\ 0 & \exp(j\pi/4) & 0 & -\exp(-j\pi/4) \end{bmatrix}.$$

The first node arrangement 500 further comprises a precoding unit 530 configured to precode the at least one symbol stream with the determined precoding matrix.

The first node arrangement 500 further comprises a transmitting unit 540 configured to transmit the precoded at least one symbol stream over a wireless channel 130 to the second node 120.

In some embodiments the first node arrangement 500 comprises a precoding codebook 180. The precoding codebook 180 may comprise precoding elements, wherein at least half of the precoding elements in the precoding codebook 180 have said product structure. In this case the determining unit 520 may be configured to select the precoding matrix having a product structure from the precoding codebook 180.

In some embodiments the first node arrangement 500 comprises a receiving unit 550 configured to receive channel information from the second node 120. In this case the determining unit 520 may be configured to determine the precoding matrix based on the channel information received from the second node 120.

The channel information may comprise a precoding matrix that the second node 120 recommends the first node 100 to use for the precoding.

In some embodiments the channel information comprises a channel estimate.

The first node arrangement 500 may further comprise a multi-antenna system with a cross-polarized antenna set-up. In this case the transmitting unit 540 may be configured to transmit the precoded at least one symbol stream in the first node 100 using said multi-antenna.

Method steps in the second node 120 for receiving a multi-antenna transmission from a first node 100 over a wireless channel 130 according to some embodiments will now be described with reference to a flowchart depicted in FIG. 6. The wireless channel 130 has at least three inputs and at least one output. As mentioned above, the first node 100 and the second node 120 are comprised in a wireless communication system 110. The method comprising the step of:

601. This is an optional step. The second node selects a precoding matrix to be recommended to be used by the first node 100 for precoding a transmission.

A precoding codebook 180, 190 may be comprised in the second node 120. In that case the recommended precoding matrix may be selected out of said precoding codebook 180, 190.

602. This is an optional step. The second node 120 conveys channel information to the first node 100. The channel information may be used by the first node 100 as base for determining a precoding matrix with which a transmission corresponding to at least one symbol stream shall be precoded.

If the optional step 601 is performed said conveyed channel information may be represented by the recommended precoding matrix.

603. The second node 120 receives a transmission corresponding to at least one symbol stream over a wireless channel 130 conveyed from the first node 100. The at least one symbol stream is precoded with a precoding matrix having a product structure created by a block diagonal matrix being multiplied from the left, with a block diagonalizing unitary matrix. In some embodiments the block diagonalizing unitary matrix is a 45 degree block diagonalizing unitary matrix.

The precoding matrix may be comprised in a precoding codebook 180, 190 of finite size wherein at least half of the precoding elements in the precoding codebook have said product structure.

The block diagonalizing unitary matrix may be equivalent to $$\begin{bmatrix} 1 & 0 & 1 & 0 \\ 0 & 1 & 0 & 1 \\ 1 & 0 & -1 & 0 \\ 0 & 1 & 0 & -1 \end{bmatrix} \text{ or } \begin{bmatrix} \exp(j\pi/4) & 0 & \exp(-j\pi/4) & 0 \\ 0 & \exp(j\pi/4) & 0 & \exp(-j\pi/4) \\ \exp(j\pi/4) & 0 & -\exp(-j\pi/4) & 0 \\ 0 & \exp(j\pi/4) & 0 & -\exp(-j\pi/4) \end{bmatrix}.$$

In some embodiments the reception of said transmission of the precoded at least one symbol stream is performed by using a multi-antenna system with a cross-polarized antenna setup.

To perform the method steps above, the second node 120 comprises an arrangement 700 depicted in FIG. 7. As mentioned above, the second node 120 is arranged to receive a multi-antenna transmission from a first node 100 over a wireless channel 130. The wireless channel has at least three inputs and at least one output. The first node 100 and the second node 120 are comprised in a wireless communication system 110.

The second node arrangement 700 comprises a receiving unit 710 configured to receive a transmission corresponding to at least one symbol stream over a wireless channel 130 conveyed from the first node 100. The at least one symbol stream is precoded with a precoding matrix having a product structure created by a block diagonal matrix being multiplied from the left with a block diagonalizing unitary matrix. In some embodiments the block diagonalizing unitary matrix is a 45 degree block diagonalizing unitary matrix. The precoding matrix may be comprised in a precoding codebook 180, 190 of finite size wherein at least half of the precoding elements in the precoding codebook have said product structure. The precoding codebook 180, 190 may be comprised in the first node 100 or the second node 120.

The block diagonalizing unitary matrix may e.g. be equivalent to $$\begin{bmatrix} 1 & 0 & 1 & 0 \\ 0 & 1 & 0 & 1 \\ 1 & 0 & -1 & 0 \\ 0 & 1 & 0 & -1 \end{bmatrix} \text{ or } \begin{bmatrix} \exp(j\pi/4) & 0 & \exp(-j\pi/4) & 0 \\ 0 & \exp(j\pi/4) & 0 & \exp(-j\pi/4) \\ \exp(j\pi/4) & 0 & -\exp(-j\pi/4) & 0 \\ 0 & \exp(j\pi/4) & 0 & -\exp(-j\pi/4) \end{bmatrix}.$$

In some embodiments the second node arrangement 700 further comprises a conveying unit 720 configured to convey channel information to the first node 100. The channel information may be used by the first node 100 as base for determining the precoding matrix with which the received at least one symbol stream will be precoded.

In some embodiments the channel information arranged to be conveyed comprises a channel estimate.

The second node arrangement 700 may further comprise a selecting unit 730 configured to select the precoding matrix to be recommended to be used by the first node 100 for precoding said transmission.

The channel information arranged to be conveyed by the conveying unit 720 to the first node 100, may be represented by the selected and recommended precoding matrix.

In some embodiments the precoding codebook 190 is comprised in the second node 120. In this case the recommended precoding matrix may be selected out of said precoding codebook 180, 190.

In some embodiments the second node arrangement 700 further comprises a multi-antenna system with a cross-polarized antenna setup. In this case the receiving unit 710 further may be configured to receive said transmission of the precoded at least one symbol stream by using said multi-antenna system.

Some embodiments of the present method may be described as a method for enhancing performance in a wireless communication environment, comprising: modifying a pre-coding scheme by multiplying one or several of: codebook pre-coder elements, a transmitted signal, or parts thereof, before or after possible pilots, with certain unitary matrices and extending a block diagonal codebook with non-block diagonal elements.

Non-block diagonal elements may be added to the block diagonal codebook to improve performance where cross polar discrimination is not infinite.

All the elements in said codebook may be multiplied with a unitary matrix to transform a ±45 degree cross-polarized antenna array into a virtual vertically and horizontally polarized array.

In some embodiments the same unitary matrix is chosen so as to balance power among the power amplifiers.

Some embodiments of the present method may be described as a wireless communication device comprising a processor configured to select a transmission mode of a plurality of transmission modes from a codebook, and a memory coupled with the processor. The processor is further configured to modify a pre-coding scheme in said memory by multiplying one or several of: codebook pre-coder elements, a transmitted signal, or parts thereof, before or after possible pilots, with certain unitary matrices and extending a block diagonal codebook with non-block diagonal elements.

Some embodiments of the present method may be described as a computer-readable media including instructions stored thereon comprising: instructions for processing and modifying a pre-coding scheme by multiplying one or several of: codebook pre-coder elements, a transmitted signal, or parts thereof, before or after possible pilots, with certain unitary matrices and extending a block diagonal codebook with non-block diagonal elements.

The present mechanism for adapting a multi-antenna transmission transmitted from a first node over a wireless channel and being received by a second node 120 may be implemented through one or more processors, such as the processor 560 in the first node arrangement 500 depicted in FIG. 5 or the processor 740 in the second node arrangement 700 depicted in FIG. 7, together with computer program code for performing the functions of the present solution. The program code mentioned above may also be provided as a computer program product, for instance in the form of a data carrier carrying computer program code for performing the present solution when being loaded into the first node 100 or the second node 120. One such carrier may be in the form of a CD ROM disc. It is however feasible with other data carriers such as a memory stick. The computer program code can furthermore be provided as pure program code on a server and downloaded to first node 100 or second node 120 remotely.

When using the word "comprise" or "comprising" it shall be interpreted as non-limiting, i.e. meaning "consist at least of".

The present invention is not limited to the above described embodiments. Various alternatives, modifications and equivalents may be used. Therefore, the above embodiments should not be taken as limiting the scope of the invention, which is defined by the appending claims.

What is claimed is:

1. A method at a first node for adapting multi-antenna transmissions to a second node over a wireless channel, the method comprising:
   determining a precoding matrix created using a matrix configured to rotationally align polarization directions of an antenna array with predetermined polarization directions;
   precoding one or more symbol streams using the precoding matrix; and
   transmitting the precoded one or more symbol streams from the first node to the second node over a wireless channel having at least three inputs and at least one output.

2. The method of claim 1 wherein the precoding matrix has a product structure decomposable into a block diagonal matrix by multiplying the block diagonal matrix from the left with a block diagonalizing unitary matrix.

3. The method of claim 1 wherein the precoding matrix comprises a plurality of elements, each element having a same magnitude.

4. The method of claim 2 wherein the block diagonalizing unitary matrix comprises a 45 degree block diagonalizing unitary matrix.

5. The method of claim 1 wherein determining a precoding matrix comprises selecting, from a precoding codebook comprising precoding elements, the precoding matrix having the product structure that is decomposable into a block diagonal matrix being multiplied from the left with a block diagonalizing unitary matrix, and wherein at least half of the precoding elements in the precoding codebook have the product structure.

6. The method of claim 2 wherein the block diagonalizing unitary matrix is equivalent to $$\begin{bmatrix} 1 & 0 & 1 & 0 \\ 0 & 1 & 0 & 1 \\ 1 & 0 & -1 & 0 \\ 0 & 1 & 0 & -1 \end{bmatrix}.$$

7. The method of claim 2 wherein the block diagonalizing unitary matrix is equivalent to $$\begin{bmatrix} \exp(j\pi/4) & 0 & \exp(-j\pi/4) & 0 \\ 0 & \exp(j\pi/4) & 0 & \exp(-j\pi/4) \\ \exp(j\pi/4) & 0 & -\exp(-j\pi/4) & 0 \\ 0 & \exp(j\pi/4) & 0 & -\exp(-j\pi/4) \end{bmatrix}.$$

8. The method of claim 1 further comprising receiving channel information from the second node, and wherein determining the precoding matrix comprises determining the precoding matrix based on the channel information received from the second node.

9. The method of claim 8 wherein the received channel information comprises a precoding matrix that is recommended to the first node by the second node for use in precoding the one or more symbol streams with the determined precoding matrix.

10. The method of claim 1 wherein the first node comprises one of a Base Station (BS) and a User Equipment (UE), and wherein the second node comprises the other of the BS and the UE.

11. A method in a second node for receiving a multi-antenna transmission from a first node over a wireless channel, the method comprising:
receiving a transmission corresponding to one or more symbol streams over a wireless channel conveyed from the first node, wherein the one or more symbol streams are precoded with a precoding matrix created using a matrix configured to rotationally align polarization directions of an antenna array with predetermined polarization directions; and
demodulating the one or more symbol streams.

12. The method of claim 11 wherein the precoding matrix has a product structure decomposable into a block diagonal matrix by multiplying the block diagonal matrix from the left with a block diagonalizing unitary matrix.

13. The method of claim 11 wherein the precoding matrix comprises a plurality of elements, each element having a same magnitude.

14. The method of claim 12 wherein the block diagonalizing unitary matrix comprises a 45 degree block diagonalizing unitary matrix.

15. The method of claim 11 wherein the precoding matrix is comprised in a precoding codebook of finite size, and wherein at least half of the precoding elements in the precoding codebook comprise the product structure.

16. The method of claim 12 wherein the block diagonalizing unitary matrix is equivalent to $$\begin{bmatrix} 1 & 0 & 1 & 0 \\ 0 & 1 & 0 & 1 \\ 1 & 0 & -1 & 0 \\ 0 & 1 & 0 & -1 \end{bmatrix}.$$

17. The method of claim 12 wherein the block diagonalizing unitary matrix is equivalent to $$\begin{bmatrix} \exp(j\pi/4) & 0 & \exp(-j\pi/4) & 0 \\ 0 & \exp(j\pi/4) & 0 & \exp(-j\pi/4) \\ \exp(j\pi/4) & 0 & -\exp(-j\pi/4) & 0 \\ 0 & \exp(j\pi/4) & 0 & -\exp(-j\pi/4) \end{bmatrix}.$$

18. The method of claim 11 wherein the second node comprises one of a Base Station (BS) and a User Equipment (UE), and wherein the first node comprises the other of the BS and the UE.

19. A first node for adapting a multi-antenna transmission to a second node over a wireless channel having at least three inputs and at least one output, wherein the first node and the second node being comprised in a wireless communication system, the first node comprising:
a determining circuit configured to determine a precoding matrix created using a matrix configured to rotationally align polarization directions of an antenna array with predetermined polarization directions;
a precoding circuit configured to precode one or more symbol streams with the determined precoding matrix; and
a transmitter configured to transmit the precoded one or more symbol streams over a wireless channel to the second node.

20. The first node of claim 19 wherein the precoding matrix has a product structure decomposable into a block diagonal matrix by multiplying the block diagonal matrix from the left with a block diagonalizing unitary matrix.

21. The first node of claim 19 wherein the precoding matrix comprises a plurality of elements, each element having a same magnitude.

22. The first node of claim 19 wherein the first node comprises one of a Base Station (BS) and a User Equipment (UE), and wherein the second node comprises the other of the BS and the UE.

23. A second node for receiving a multi-antenna transmission from a first node over a wireless channel having at least three inputs and at least one output, the first node and the second node being comprised in a wireless communication system, the second node comprising:
a receiver configured to receive a transmission corresponding to one or more symbol streams over a wireless channel conveyed from the first node, wherein the one or more symbol streams are precoded with a precoding matrix created using a matrix configured to rotationally align polarization directions of an antenna array with predetermined polarization directions; and
a decoding demodulation circuit configured to demodulate the one or more symbol streams.

24. The second node of claim 23 wherein the precoding matrix has a product structure decomposable into a block diagonal matrix by multiplying the block diagonal matrix from the left with a block diagonalizing unitary matrix.

25. The second node of claim 23 wherein the precoding matrix comprises a plurality of elements, each element having a same magnitude.

26. The second node of claim 23 wherein the second node comprises one of a Base Station (BS) and a User Equipment (UE), and wherein the first node comprises the other of the BS and the UE.

* * * * *

UNITED STATES PATENT AND TRADEMARK OFFICE
CERTIFICATE OF CORRECTION

PATENT NO. : 10,051,492 B2
APPLICATION NO. : 15/198418
DATED : August 14, 2018
INVENTOR(S) : Jöngren It is certified that error appears in the above-identified patent and that said Letters Patent is hereby corrected as shown below:

On the Title Page

Column 1, below "Related U.S. Application Data", delete Item "(60)" and insert Item -- (63) --, therefor.

In the Specification

Column 1, Line 11, delete "2015," and insert -- 2015, now U.S. Pat. No. 9,419,695, --, therefor.

Column 1, Line 18, delete "which is" and insert -- which in --, therefor.

Column 8, Line 61, delete "$Z_{\tilde{M}_1 \times \tilde{L}_2^*}$" and insert -- $Z_{\tilde{M}_1 \times \tilde{L}_2}$ --, therefor.

Column 11, Line 35, delete "k=0, . . . 3" and insert -- k=0, . . . , 3 --, therefor.

Column 11, Line 40, delete "k=0, . . . 3" and insert -- k=0, . . . , 3 --, therefor.

Column 11, Line 45, delete "k=0, . . . 3" and insert -- k=0, . . . , 3 --, therefor.

Column 11, Line 58, delete "k=0, . . . 3" and insert -- k=0, . . . , 3 --, therefor.

Column 11, Line 63, delete "k=0, . . . 3" and insert -- k=0, . . . , 3 --, therefor.

Column 12, Line 8, delete "k=0, . . . 3" and insert -- k=0, . . . , 3 --, therefor.

Column 13, Line 20, delete "k=0, . . . 3" and insert -- k=0, . . . , 3 --, therefor.

Column 13, Line 25, delete "k=0, . . . 3" and insert -- k=0, . . . , 3 --, therefor.

Signed and Sealed this
Second Day of April, 2019

Andrei Iancu
*Director of the United States Patent and Trademark Office*

Column 13, Line 31, delete "k=0, . . . 3" and insert -- k=0, . . . , 3 --, therefor.

Column 13, Line 36, delete "k=0, . . . 3" and insert -- k=0, . . . , 3 --, therefor.

Column 13, Line 42, delete "k=0, . . . 3" and insert -- k=0, . . . , 3 --, therefor.

Column 13, Line 47, delete "k=0, . . . 3" and insert -- k=0, . . . , 3 --, therefor.

Column 13, Line 63, delete "k=0, . . . 3" and insert -- k=0, . . . , 3 --, therefor.

Column 14, Line 11, delete "k=0, . . . 3" and insert -- k=0, . . . , 3 --, therefor.

Column 15, Line 11, delete "k=0, . . . 3" and insert -- k=0, . . . , 3 --, therefor.

Column 15, Line 17, delete "k=0, . . . 3" and insert -- k=0, . . . , 3 --, therefor.